Patented Apr. 11, 1950

2,503,258

UNITED STATES PATENT OFFICE 2,503,258

NEUTRALIZATION OF PECTINIC ACIDS WITH SODIUM BICARBONATE

Robert P. Graham, Albany, and Allan D. Shepherd, El Cerrito, Calif., assignors to United States of America as represented by the Secretary of Agriculture No Drawing. Application January 23, 1948, Serial No. 4,055

5 Claims. (Cl. 260—209.5)

(Granted under the act of March 3, 1883, as amended April 30, 1928; 370 O. G. 757)

This application is made under the act of March 3, 1883, as amended by the act of April 30, 1928, and the invention herein described and claimed, if patented in any country, may be manufactured and used by or for the Government of the United States of America throughout the world for governmental purposes without the payment to us of any royalty thereon.

This invention relates to low-methoxyl pectinic acids and particularly to a process for preparing partially-neutralized low-methoxyl pectinic acids in a form which is granular, free-flowing, and easy to grind. This process comprises the partial neutralization of low-methoxyl pectinic acids by the use of sodium bicarbonate under certain conditions.

Low-methoxyl pectinic acids, as such, are incapable of many uses as they are not readily soluble in water. For this reason they are usually partially neutralized with a base. This partial neutralization renders the pectinic acids readily soluble in water whereby they can be utilized for many purposes, for instance, in making jellies, puddings, and fruit spreads. Further, in the partially neutralized form the pectinic acids are more stable, the rate of demethoxylation and degradation upon storage being low. By partial neutralization it is meant that some of the carboxyl groups in the pectinic acid are salified. Thus, the product prepared by partial neutralization with sodium ions for instance, is a sodium hydrogen pectinate. Usually the amount of pectinic acid and neutralizing agent are in such proportion that when a 1% aqueous solution is made of the product it will have a pH from about 4 to about 5, preferably about 4.5. At this pH range the product has good water solubility and good stability.

An object of this invention is to provide a simplified process for preparing partially-neutralized, low-methoxyl pectinic acids.

Another object of this invention is to provide a process for preparing partially-neutralized, low-methoxyl pectinic acids in which process the use of organic solvents and the need for concentration is eliminated.

Another object of this invention is to provide a process for partially neutralizing low-methoxyl pectinic acids while preventing substantial de-methoxylation and degradation thereof.

Further objects and advantages will be obvious from the description herein.

The known methods for preparing partially neutralized low-methoxyl pectinic acids are generally cumbersome and expensive. For instance, one method involves adjusting an aqueous suspension of the low-methoxyl pectinic acid to a pH of 3.7 to 4.5 by adding ammonia or sodium hydroxide. The partially-neutralized pectinic acids are very soluble at this pH and can be precipitated only by adding alcohol or other organic solvent. It is also known to subject the aqueous solution of partially-neutralized pectinic acid to complete concentration as by drum- or spray drying to obtain the solid product. Another method involves precipitating the pectinic acids by adding alcohol and then partially neutralizing the precipitated gel with ammonium hydroxide. These processes are cumbersome and expensive because of the necessity of employing organic solvents or complete concentration. In our process these items are eliminated thus effecting savings in cost and making the process simple and direct.

We have found that low-methoxyl pectinic acids can be partially neutralized in a simple and effective manner by the use of sodium bicarbonate, under particular conditions, whereby use of organic solvents, complete concentration and other cumbersome and expensive items are entirely omitted.

To this end, a low-methoxyl pectinic acid gel, obtained, for instance, by precipitation with acid, is dewatered to a moisture content of 40% to 72%, preferably 50% to 70%. The resulting gel is macerated and mixed with the required proportion of powdered sodium bicarbonate. The mixing is preferably accomplished in a suitable device such as a dough-type mixer or tumble mixer. The partially-neutralized product is then dried, for example, in a forced draft oven and is ready for sale or use.

It is to be emphasized that in our process, solid sodium bicarbonate, preferably in the powdered form as available commercially, is used directly as the neutralizing agent. Thus the expense and time usually involved in forming a solution of the neutralizing agent is eliminated.

Low-methoxyl pectinic acids may be considered as pectin derivatives obtained therefrom by partial de-methoxylation. These compounds therefore are made up of chains of galacturonide nuclei and contain free carboxyl groups (—COOH) as well as carbomethoxy groups (—COOCH$_3$). These low methoxyl pectinic acids are labile in two respects; first, as to de-methoxyation, whereby the carbomethoxy groups (—COOCH$_3$) are converted into carboxyl groups (—COOH); and second as to degradation, whereby the length of the polygalacturonide chain is reduced by splitting. These changes can easily be followed by chemical and physical measurements. De-methoxylation is measured by reduction in methoxyl content and degradation is measured by decrease in intrinsic viscosity of the compound. Since the low-methoxyl pectinic acids have these labilities, partial neutralization by known methods often causes both types of chemical change. Thus when it is attempted to partially neutralize these acids with some alkaline materials, as for example sodium hydroxide or sodium carbonate, localized demethoxylation and degradation often occur. Both of these changes are undesirable and if they occur to an appreciable extent, alter the properties of the low-methoxyl pectinic acid and render it unfit for the particular uses desired. We have found that when the low-methoxyl pectinic acid gels are neutralized with sodium bicarbonate under the particular conditions disclosed herein, no substantial de-methoxylation or degradation occurs as ascertained by actual chemical and physical tests.

It is to be emphasized that the instant invention deals with low-methoxyl pectinic acids. These compounds are to be distinguished from the related compounds pectin and pectic acid. Pectin is a polygalacturonide prepared from plant extracts by alcohol, acetone, or metallic salts precipitation with no attempt to modify its natural methoxyl content. Pectic acid is a completely de-methoxylated pectin, that is, the pectin nucleus is retained but the carbomethoxy groups (—COOCH₃) have been de-esterified to carboxyl groups (—COOH). Low-methoxyl pectinic acids are derived from pectin or pectin source materials by partial de-methoxylation thereof and contain both carboxyl groups and carbomethoxy groups. The low-methoxyl pectinic acids prepared by acid or alkaline de-methoxylation having a methoxyl content from about 2% to about 5% and the low-methoxyl pectinic acids prepared by enzymatic de-methoxylation having a methoxyl content from about 2% to about 7% are the most valuable for many commercial uses, such as for making low-sugar jellies, and milk puddings.

For the purpose of carrying out the partial neutralization as described herein the low-methoxyl pectinic acid gel is preferably made by acid precipitation. This technique which is described and claimed in the co-pending application of Rolland M. McCready, Harry S. Owens, and William D. Maclay, Serial No. 616,445, filed September 14, 1945, now Patent No. 2,448,818, involves addition of a mineral acid to a solution of the low-methoxyl pectinic acid. The amount of mineral acid is regulated to establish a pH not exceeding 2, preferably about 1.5. The low-methoxyl pectinic acids are insoluble under such conditions and precipitate out of solution as a gel. The original solution of low-methoxyl pectinic acid may be made by alkaline, acid, or enzymic partial-demethoxylation of pectin or pectin source materials such as apple pomace, citrus peel, etc.

The moisture content, or conversely, the solids content, of the pectinic acid gel is a critical factor in the process. It is essential that the moisture content be from 40% to 72% and preferably from 50% to 70%. It has been found that if the moisture content of the gel is above 72%, then upon mixing the gel with the sodium bicarbonate, the individual particles of material cohere to form a gummy mass. When it is attempted to dry this mass a horny material is formed which is difficult to grind. Further the drying process is slow because of the compact nature of the material. Sometimes during drying the entire trayful of the gummy mass will compact into a solid block of dense, horny material which is entirely unsuitable for the intended uses.

On the other hand if the gel has too low a moisture content then proper neutralization cannot be obtained and the product will not be homogeneous but will contain pectinic acid, partially-neutralized pectinic acid, and sodium bicarbonate. Furthermore, in drying the pectinic acid gel to a high solids content it is practically impossible to obtain a product uniform in moisture content. The outer portions of the gel which were in good contact with the drying air will be much lower in moisture content than inner portions of the gel.

It is immaterial by what process the low-methoxyl pectinic acid gel is brought to the proper moisture content. Usually the gel prepared, for example, by acid precipitation, is reeled, that is, passed through a rotary, cylindrical screen, pressed in a cheese-cloth, washed with water to remove soluble impurities, reeled and pressed again. By carrying out several pressings the moisture content can be brought down to about 65% to 72%. If a lower moisture content is desired the gel can be subjected to other drying operations. For instance, the gel can be placed on trays and subjected to a forced draft of heated air at about 150° F. If desired the material can be dried by exposing to air at room temperature or by passing it through a rotary kiln dryer at about 150° F. or by use of a vacuum dryer. If it is desired to eliminate some of the reeling and pressing operations then the gel containing more than 72% moisture can be subjected to any of the above-mentioned types of drying to obtain the proper moisture content.

After the gel has been dewatered to the proper moisture content it is macerated. This can easily be accomplished by beating in a dough-type mixer for a short time before the powdered sodium bicarbonate is added. Other known methods or devices may be used to extend the surface of the gel.

The following examples describe the process of this invention applied to particular materials under particular conditions. It is to be understood that these examples are furnished only by way of illustration and not limitation.

EXAMPLE 1

(A) *Preparation of low-methoxyl pectinic acid gel*

Twenty-one lbs. of a 1.08% solution of pectin in water, obtained from dried Valencia orange peel, was adjusted to 58° F. To this solution, 273 ml. of concentrated ammonium hydroxide was added and the aforesaid temperature was approximately maintained for a period of 95 minutes. At the end of this time, 175 ml. of concentrated sulphuric acid was added and the mixture allowed to stand for 2 hours. The watery-gel of low-methoxyl pectinic acid was separated from the liquid phase, and repeatedly reeled, pressed, water-washed, reeled and pressed until 1 lb. 4 oz. of partially dried gel was obtained. This material had a moisture content of 71.3%, methoxyl content of 3.1%, and an intrinsic viscosity of 2.7.

(B) *Partial neutralization*

Ten oz. of the low-methoxyl pectinic acid gel prepared as described above was placed in a dough-type mixer and macerated by operating the mixer for a few minutes. Then 18.2 grams of powdered sodium bicarbonate was added and the mixer operated to thoroughly blend the ingredients. The resulting material was then placed in a tray dryer equipped with a forced draft of air at 150° F. At the end of 3 hours the partially-neutralized low-methoxyl pectinic acid was removed from the dryer. It was found to be in the form of small discrete particles resembling dried brown sugar in appearance. The individual particles showed no tendency to cohere but remained separate. This material could easily be ground and went into solution in water very readily—a 1% solution having a pH of 4.0. Yield: 92 grams of partially-neutralized low-methoxyl pectinic acid, methoxyl content (ash-free basis) 3.1%. Intrinsic viscosity 2.7.

EXAMPLE 2

(A) *Preparation of low-methoxyl pectinic acid gel*

Eighty-three lbs. of a 1.08% solution of pectin in water, obtained from dried Valencia orange peel, was adjusted to 59° F. To this solution, 950 ml. of concentrated ammonium hydroxide was added and the aforesaid temperature approximately maintained for a period of 95 minutes. At the end of this time, 600 ml. of concentrated sulphuric acid was added. The watery gel of low-methoxyl pectinic acids was separated from the liquid phase, and repeatedly reeled, pressed, water-washed, reeled and pressed. The resulting partly de-watered gel was macerated in a dough-type mixer, passed through an 8-mesh screen and placed in a tray dryer equipped with forced air draft at 150° F. After partial drying the material was removed. Yield of low-methoxyl pectinic acid, 1 lb. 15 oz.; moisture content, 60%; methoxyl content, 3.2%; intrinsic viscosity 2.7.

(B) *Partial neutralization*

1 lb. 12 oz. of the pectinic acid gel prepared as above described was mixed in a dough-type mixer with 90 grams of powdered sodium bicarbonate. The resulting material was then placed in a tray dryer equipped with a forced draft of air at 150° F. After 3 hours the partially-neutralized low-methoxyl pectinic acid was removed from the dryer. It was found to be in the form of small, discrete particles resembling dried brown sugar in appearance. The individual particles showed no tendency to cohere but remained separate. This material could easily be ground and went into solution in water very readily—a 1% solution giving a pH of 4.95. Yield of partially-neutralized low-methoxyl pectinic acid, 350 grams; methoxyl content (ash-free basis), 3.1%; intrinsic viscosity, 2.6.

The following control experiment does not illustrate the process of this invention but is included to show that the moisture content of the pectinic acid gel is critical.

*Control experiment I*

A sample of low-methoxyl pectinic acid gel was prepared in exactly the method described in Example 1, part A. However, the gel was not reeled and pressed as much as in that example and thus the finished gel contained 74.3% moisture. Twelve oz. of this gel was macerated and then mixed in a dough-type mixer with 18.2 grams of sodium bicarbonate. The material compacted as a single gummy mass in the mixer. This material was discarded as obviously of no practical utility. Since the entire mass had coalesced into a gummy mass, drying it would only render it more compact and difficult to grind and dissolve.

The amount of sodium bicarbonate necessary to obtain the proper degree of neutralization can be obtained in several ways. One method involves mixing the gel with some sodium bicarbonate, then dissolving a portion of the product in water and determining the pH of the solution. By making several small batches using different proportions of gel and sodium bicarbonate, the proper ratio can be easily determined. Another method involves titrating a sample of gel with standard base. From the amount of base required to obtain the desired pH, the amount of sodium bicarbonate can be readily determined by the usual stoichiometrical calculations. As previously set forth, the ratio of pectinic acid gel and sodium bicarbonate should be such that a 1% solution of the product will have a pH from about 4 to about 5.

Having thus described our invention, we claim:

1. A process of preparing a partially-neutralized, low-methoxyl pectinic acid in granular, free-flowing form which comprises mixing a low-methoxyl pectinic acid gel having a moisture content from 40% to 72% with solid sodium bicarbonate and drying the resulting product.

2. A process of preparing a partially-neutralized, low-methoxyl pectinic acid in granular, free-flowing form which comprises mixing a low-methoxyl pectinic acid gel having a moisture content from 50% to 70% with solid sodium bicarbonate and drying the resulting product.

3. A process of preparing a partially-neutralized, low-methoxyl pectinic acid in granular, free-flowing form which comprises mixing a low-methoxyl pectinic acid gel having a moisture content from 40% to 72% with an amount of solid sodium bicarbonate less than required for complete neutralization and drying the resulting product.

4. A process of preparing a partially-neutralized, low-methoxyl pectinic acid in granular, free-flowing form which comprises mixing a low-methoxyl pectinic acid gel having a moisture content from 50 to 70% with the amount of powdered sodium bicarbonate necessary to obtain a pH from about 4 to about 5 in a 1% solution of the product and then drying the partially-neutralized gel.

5. A process of preparing partially-neutralized, low-methoxyl pectinic acid comprising mixing a low-methoxyl pectinic acid gel having a moisture content from 40% to 72% with sodium bicarbonate in solid phase in an amount less than required for complete neutralization.

ROBERT P. GRAHAM.
ALLAN D. SHEPHERD.

REFERENCES CITED

The following references are of record in the file of this patent:

UNITED STATES PATENTS

| Number | Name | Date |
|---|---|---|
| 2,132,434 | Rauer et al. | Oct. 11, 1938 |

OTHER REFERENCES

McReady et al.: Ind. Eng. Chem., v. 38 (1946), pp. 1254–1256, 3 pages.